United States Patent [19]  [11] 4,240,936
Henning  [45] Dec. 23, 1980

[54] AQUEOUS INSULATIVE COATING COMPOSITIONS CONTAINING KAOLIN AND STAPLE FIBERS

[76] Inventor: William J. Henning, 220 Forest Ave., Cincinnati, Ohio 45215

[21] Appl. No.: 35,462

[22] Filed: May 3, 1979

[51] Int. Cl.$^3$ .................................................. C08L 1/28
[52] U.S. Cl. ............................. 260/17 R; 106/163 R; 106/193 R; 106/197 C; 106/308 B; 260/17.4 R; 428/454; 428/537
[58] Field of Search ......................... 260/17.4 R, 17 R; 106/308 B, 193 R, 197 C, 163 R

[56] References Cited

U.S. PATENT DOCUMENTS

| | | | |
|---|---|---|---|
| 2,062,996 | 12/1936 | Leppik | 106/204 |
| 2,333,023 | 10/1943 | Manor | 428/454 |
| 2,478,634 | 9/1949 | Lum | 260/17.2 |
| 3,689,297 | 9/1972 | Dybalski | 106/308 B |
| 3,856,564 | 12/1974 | Kirkham | 428/454 |
| 4,109,049 | 8/1978 | Thompson | 428/454 |
| 4,111,730 | 9/1978 | Balatinecz | 106/163 R |
| 4,155,887 | 5/1979 | Hetson | 260/16 |

FOREIGN PATENT DOCUMENTS 569679 8/1977 U.S.S.R. ............................. 106/193 R

OTHER PUBLICATIONS

Chem. Absts., vol. 76:142567h, Carboxymethyl Cellulose-Binder-Paper, Milov et al.
Chem. Absts., vol. 83:136152x, High-Temperature Heat-Insulating Compensation Material, Dibrov et al.
Chem. Absts., 83:149,423m, Treatment of Silicate Minerals for Paper Coating, Malden.
The Cond. Chem. Dict., 5th Ed., p. 619.

Primary Examiner—Edward M. Woodberry
Attorney, Agent, or Firm—Wood, Herron & Evans

[57] ABSTRACT

A liquid multi-purpose coating composition is disclosed which has significant resistance to heat transfer. The coating composition may be applied to many different types of substrates including wood, metal, concrete and other structural materials. The composition is a water-based liquid containing principally kaolin, staple fibers and a dispersing agent. The coating composition and articles coated therewith exhibit excellent insulating properties against heat and radiant energy. Considerable energy savings and various economies are obtained by the insulative compositions.

14 Claims, No Drawings

AQUEOUS INSULATIVE COATING COMPOSITIONS CONTAINING KAOLIN AND STAPLE FIBERS

BACKGROUND OF THE INVENTION

The art of coating compositions has been very well developed. Considerable effort has been devoted to the development of protective and decorative layers which may be formed on numerous substrates of metal, wood and other structural materials. In recent times, more emphasis has been placed upon the insulative capability of various structural materials and, in view of the current energy requirements and natural resources, there is a significant need for highly efficient insulative materials and structures.

A large body of patent are generally exists relating to coating compositions. Among this patent art, the following U.S. Pat. Nos. are considered to be representative and to serve as background information for this invention: 2,413,570; 2,414,391; 2,486,756; 2,509,599; 2,567,678; 2,572,252; 2,811,500; 3,202,567; 3,239,475; 3,284,378; 3,311,585; 3,325,425; 3,813,356; 3,836,495; 3,844,990; 3,907,726 and RE27,093. The above patents are not represented to be the most pertinent patents, but are considered to disclose coating compositions which are known and may be compared to the subject matter of this invention.

SUMMARY OF THE INVENTION

The insulative coating composition of this invention consists essentially of kaolin particles, staple fibers and a dispersing agent in an aqueous medium. It has been found that a highly efficient insulative coating composition may be formulated in a liquid state having a viscosity which makes it easily employed as a paint composition or a multi-purpose coating. This composition has been found to provide substantial resistance to transfer of heat or radiant energy. The composition can be very economically formulated to provide an energy saving coating. In this connection, it has been discovered that articles such as walls, window frames, light fixtures, and the like can be provided with a coating which will enable insulative properties to be enhanced on significant orders of magnitude even with relatively thin coating layers.

In a preferred form, the insulative coating composition consists essentially of an aqueous medium containing film-forming solids consisting essentially of a substantial amount of kaolin, a minor amount of cellulose fibers and a minor amount of a dispersing agent. In this composition, it has been found that the kaolin may be film-formed onto a surface and provide a significant insulating capability. The effects are considered to be surprising and heretofore unappreciated. Also, the coating may be subjected to environmental, as well as extreme ambient stress conditions, and the coating will not crack, peel or powder. In this composition, the cellulose fibers may be very economically provided by waste paper or newsprint which has been shredded and blended with the kaolin and dispersing aids.

In another preferred form, the insulative coating composition is formulated with kaolin in a substantial amount to provide insulating capability, cellulosic fibers in a binding amount, dispersing aids and a thickening or thixotropic agent in a minor amount. This formulation permits the employment of amounts of insulative kaolin clay, adequately dispersed and stabilized in a liquid base to be suitably employed as a paint or coating composition. Compositions containing these essential ingredients have been employed to coat various surfaces and such coatings formed thereby have been found to be adequately bonded to the substrate and capable of withstanding environmental stress without peeling or otherwise degrading.

In an alternative form of this invention, particularly to enhance the bonding strength of the coating composition to a surface, polymer or latex binders may also be employed. For instance, in a decorative paint or covering, such latex binders will enhance the finish the coating endurance. Furthermore, auxiliary additives including antifoaming agents, wetting agents, pigments, coalescing agents for the latex polymer particles, opacifying agents, extenders, bactericides, fungicides, and the like may be employed in the composition to obtain their needed effects, when desired. The inclusion of such compositions depends upon the end use, for instance, whether it is to be employed as a wall paint or in other environments where a decorative effect is not essential.

In formulating the compositions of this invention, the kaolin component is the critically essential component to provide the insulative capability necessary to obtain the benefits of the invention. The amount of kaolin employed will vary, but a substantial amount must be employed in the aqueous media in order to provide a coating which may be film-formed and insulating. Whereas kaolin has been employed in prior coating compositions, it is not known by applicant to have been employed in substantially large amounts such that the coating which is film-formed consists essentially of insulative kaolin. Therefore, amounts of kaolin on the order of about 30 to about 90% by weight are employed in aqueous media to achieve the desired results. Another essential component is the fibrous binder. It has been found that cellulose fibers, made from shredded newspaper which has been blended in the aqueous media, such that the fibers become dispersed therein, are suitable. In general, staple fibers, i.e., on an order of magnitude of about ¼ inch to about 2 inches, enable the coating composition to be applied satisfactorily to a surface. The fibers permit the aqueous kaolin coating composition to be film-formed on a surface and bound thereon without cracking. In other words, the fibers serve an essential binding function on the kaolin solids which are film-formed on a surface. The cellulose fibers also provide a supplemental insulating capability, depending upon the quantity employed in the composition. Generally, reinforcing staple fibers are included on an order of about 1 to about 5 percent by weight. It should be understood that the so called "staple" fibers vary in length, but are normally short fibers and these are preferred. Whereas, it is also preferable to employ cellulosic fibers because they are relatively inexpensive, and such fibers have been found to coact with the kaolin clay to provide the desired results, it should be understood that other fibers of a similar nature including cotton, wool, wood, glass, polyester, or the like may be employed to provide the desired results according to the principles of this invention. However, for economies and energy savings, waste paper fibers are preferred.

Dispersants are employed in the aqueous coating compositions to adequately suspend and stabilize the kaolin particles in the aqueous media along with the binding cellulosic fibers and other additives. Such dispersing agents or surfactants are well known and developed in the coating art. Typically, the surfactants are of the anionic type. Inorganic anionic surfactants or dispersing aids include tetra potassium pyro phosphate, other alkali metal phosphorus salts, or other alkali or alkaline earth metal salts. Other anionic surfactants include alkali and alkaline earth metal salts of neutralized phosphoric acid esters of oxyalkylated higher alkyl phenols or aliphatic monohydric alcohols. Other anionic surfactants of saponified fatty acids or soaps are well known in the coatings art and reference may be made to the above patents for further details of such dispersing aids or surfactants. In general, a surfactant or dispersing aid is employed in a minor amount, i.e., on an order of about 0.01 to about 1.5% by weight. In addition to the anionic dispersing aids or surfactants, nonionic agents may also be employed. Typically, the nonionic surfactants have hydrophilic portions or side chains usually of the polyoxyalkylene type. The oil soluble or dispersible part of the molecule is derived from either fatty acids, alcohols, amides or amines. By suitable choice of starting materials and regulation of the length of the polyoxyalkylene chain, the surfactant parts of the nonionic detergents may be varied as is well known. Suitable examples of nonionic surfactants include alkyl phenoxy polyoxy ethylene glycol, for example, ethylene oxide adduct of either octyl-, nonyl- or tridecyl phenol and the like. These mentioned nonionic surfactants are usually prepared by reaction of the alkyl phenol with ethylene oxide. Other anionic or nonionic dispersants or surfactants which may be employed and are well known in the coating formulation art are disclosed, for example, in "Surface Active Agents and Detergents" by Schwartz et al (1958, Interscience Publishers, New York).

When the kaolin is employed in a substantial amount in the aqueous media, for example 70 percent by weight, it tends to have its own thixotropic properties. Accordingly, the coating composition may be so formulated at such high solids concentrations of kaolin and the viscosity is such that it may be readily applied as a paint or coating. However, at lower concentrations of kaolin, for example about 30–40%, it may be necessary to employ a thickening agent. Thickening or thixotropic agents such as hydroxy ethyl cellulose, methyl cellulose, carboxy methyl cellulose therefore may be employed in a very minor amount on the order of about 0.01 to about 1.5% by weight. Other thickeners which may be used are polyvinyl alcohol, gum arabic, gum tragacanth, ammonium polyacrylate, sodium polyacrylate, ammonium alginate, sodium alginate, and the like.

As also mentioned, when desired, a polymer or latex binder may be employed to serve as a supplemental binder and aid in the adherence of the coating composition to a surface. Conventional latex polymers are usually thermoplastic. The polymer particles are made sufficiently soft or additives are included in the formulation to permit coalesence of the particles as a film after it is formed. Polymers and copolymers of acrylic acid, methacrylic acid, esters of these acids, etc., generally called an "acrylic resin" are usually employed. Vinylacetate and ethylene copolymers are also employed in such latices. Among other water dispersible binders are polyvinyl alcohol, hydrolyzed polyvinyl acetate, hydrolyzed copolymers of vinyl esters or organic acids with other polymerizible comonomers, for example, copolymer of vinyl acetate and ethyl acrylate, and the like. Other polymer based latices may be employed with reference to the above mentioned patents. When employed, depending upon the desired effect, such latices are used in amounts of from about 5 to about 20 percent by weight. In compositions of this invention, an acrylic resin, a polyvinyl acetate or copolymers thereof are preferred.

Other ingredients, such as fungicides may also be included. Among the suitable pigments which may be used in accordance with this invention are the finely divided rutile titanium dioxides. Pigments other than rutile titanium dioxide can, however, also be used. The pigment particles should not have a diameter in excess of about 50μ, but particle sizes even as little as 0.1 are suitable. The particle sizes of the kaolin follow the same general rule.

The principles of this invention will be further understood with reference to the following examples.

EXAMPLE I

An insulative coating composition was prepared by blending the following ingredients:

| Percent | |
|---|---|
| 42.64 | Water |
| .14 | Tetra Potassium Pyro Phosphate (Surfactant or Dispersing Aid) |
| .43 | Anti-foam |
| .43 | Wetting Agent (Pigment Wetting Aid) |
| .36 | Lechithin (Pigment Dispersing Aid) |
| 2.13 | Ethylene Glycol (Moisture Release Retardant) |
| 1.42 | Butyl Ether of Diethylene Glycol Acetate (Coalescing Agent for Polymer Particles) |
| .43 | Diethylene Glycol Ethyl Ether (Coalescing Agent for Polymer Particles) |
| .07 | Bactericide-Fungicide |
| 3.13 | Titanium Dioxide (Pigment) |
| 4.26 | Calcined Clay (Opacifying Agent) |
| 3.55 | Calcium Carbonate (Extenden) |
| 30.70 | Kaolin (Particle Size Approximately 0.2 to 0.3μ) |
| .07 | Hydroxy Ethyl Cellulose (Thickening Agent) |
| 9.24 | Vinyl Acetate Acrylic Copolymer Latex |
| 1.00 | Cellulose Fiber |

The above composition was formulated for painting interior surfaces. The kaolin component was contained in a high percentage on a dry weight basis and the cellulosic fibers were provided by shredded newsprint which was dispersed throughout the aqueous media during high speed blending. In this formulation a vinyl acetate acrylic copolymer latex is used to provide additional binding strength of the coating on the wall surface. The other ingredients and their function are identified in the above listing of the components.

The composition of Example I was coated onto the interiors of aluminum window frames. The coating composition was applied with a brush on an unpainted aluminum interior window frame in a thickness of approximately 4-6 mils. With an outside air temperature of about 40° F. and an indoor temperature of about 65° F., the window frames coated with the insulative composition exhibited a temperature of about 55° F. The temperature results were obtained using a Raytex Infrared Scanner No. R380RVF, having an accuracy of plus or minus 2° F. The uncoated window frames in the same room exhibited a temperature reading of 62° F. The temperature reading on the outside frame that was coated on the interior frame with the insulative coating composition was about 53° F. The temperature on the outside frame that was not coated on the interior frame was about 60° F. Accordingly, the insulative coating composition of this invention when applied to such an aluminum substrate provided about a 10 to 12% reduction in heat loss.

In order to further demonstrate the insulative characteristics of a coating composition formed in accordance with the principles of this invention, a 9 inch length of ⅝ inch OD copper tubing was coated with approximately a ⅜ inch thickness of the insulative coating composition of Example I from one end of the tubing for 5 inches. The insulative coating was applied with a brush in successive layers allowing each layer to dry in order to achieve a ⅜ inch thickness. A butane torch with a ½ inch diameter flame tip, approximating 1000° F. or more, was used having a blue flame length of approximately ½ inch. The uncoated portion of the copper tube was held about ½ inch above the flame. The flame was directed ½ inch from the end of the tube. The hand-held tube was held ½ inch from the end of the coated portion of the tube for about 5 minutes. At this point, the flame was terminated and the coated portion of the tube ½ inch from the end was determined to be about 125° F. using the infrared scanner mentioned above. This demonstrates the highly insulative character of the coating composition of this invention.

The coating composition formulated in accordance with Example I was also applied to walls, ceilings and floors with suitable applicators in thicknesses approximating about 10–12 mils. After a passage of about 6 months, the coating did not chip, peel or powder. Furthermore, such coatings applied to heating ovens have exhibited considerable natural gas savings. For instance, the interior of a large industrial bake oven was coated on its walls, ceiling and floor with the composition of Example I having a thickness approximating 10–12 mils. This coating after six months has not chipped, peeled or powdered. Prior to coating the industrial bake oven, a start-up of the oven up to the oven temperature of 300° F. required about 55 minutes. After coating, only 30 minutes were required to come up to 300° F. Additionally, the following temperature readings were taken at four different locations on the exterior of the insulated oven booth, both before and after the coating was applied.

|  | °F. Before | °F. After |
|---|---|---|
| Control Area | 100° | 95° |
| Porthole Area | 140° | 130° |
| Main Access | 110° | 104° |
| Rear Access Door | 105° | 100° |

The above temperature readings demonstrate that a significant reduction in heat loss employing the insulative coating composition of this invention.

EXAMPLE II

The following ingredients were formulated from a slurry by high speed blending.

| Percent | Ingredient |
|---|---|
| 16.16 | Water |
| .85 | Tetra Potassium Pyro Phosphate |
| .51 | Anti-foam |

-continued

| Percent | Ingredient |
|---|---|
| 2.55 | Ethylene Glycol |
| 1.70 | Butyl Ether of Diethylene Glycol Acetate |
| .51 | Diethylene Glycol Ethyl Ether |
| .08 | Bactericide-Fungicide |
| 3.74 | Titanium dioxide |
| 61.58 | 70% Kaolin Slurry |
| .08 | Hydroxy Ethyl Cellulose |
| 11.05 | Vinyl Acetate Acrylic Copolymer Latex |
| 1.19 | Cellulose Fiber |

The functions of the respective ingredients listed were essentially the same as the functions of the same ingredients of Example I. The composition of Example II was used to coat a reflective shielf on a recessed ceiling light using a 200 Watt bulb to produce radiant heat. The ceiling light was located approximately 5 feet above a Formica top table having a medium brown color in a room heated at about 63° F. Prior to coating the reflective shield with the above composition, the light was turned on for about one hour. There was no temperature change observed upon taking readings of the table surface upon employing the infrared scanner described in Example I. However, after coating the reflective shield of the lighting fixture using the coating composition of this Example II, the temperature reading on the table was about 67° F. after one hour with the light. The room temperature remained at 63° F. The reflective shield was silver before coating and an off-white after coating. This Example demonstrates that heat energy was significantly reflected off of the light shield. The composition of Example II has also been applied to various surfaces in a manner similar to the composition of Example I with substantially similar results.

In addition, the composition of Example I has been employed on the intake manifold of an internal combustion engine of a car. Present data indicates that a significant increase in power performance is immediately observable. Mileage checks also demonstrate that approximately 20% fuel savings have been observed. This indeed demonstrates the advantageous energy saving and antipollution character of the coating compositions of this invention.

EXAMPLE III

The following ingredients were formulated in a manner similar to the above examples.

| Percent | Ingredient |
|---|---|
| 16.16 | Water |
| .85 | Tetra Potassium Pyro Phosphate |
| .51 | Anti-foam |
| .08 | Bactericide-Fungicide |
| 61.58 | 70% Kaolin Slurry |
| .08 | Hydroxy Ethyl Cellulose |
| 1.19 | Cellulose Fiber |

The above formulation was essentially the same as Example II, except that the latex binder, coalescing agents and pigment were eliminated. When the formulation was employed to coat various surfaces in a manner substantially similar to the coating of articles according to Examples I and II, substantially similar results of insulative and reflective capabilities were achieved.

In accordance with the above description and operating examples, other modifications may be made to this invention without departing from the spirit and scope thereof.

I claim:

1. An insulative aqueous coating composition containing film-forming solids consisting essentially of kaolin particles in an amount on the order of about 30% to about 90% by weight, staple fibers and a dispersing agent for said solids in the aqueous composition, said kaolin particles having a diameter less than about 50 microns.

2. The composition of claim 1 further comprising a thickening agent.

3. The composition of claim 2 wherein said thickening agent is a cellulosic thickener.

4. The composition of claim 3 wherein said cellulosic thickener is selected from the group of methyl cellulose, hydroxyethyl cellulose and carboxymethyl cellulose.

5. The composition of claim 1 further comprising a minor amount of a latex binder.

6. The composition of claim 5 wherein said latex binder is selected from the group of an acrylic resin, a vinyl acetate polymer, and copolymers thereof.

7. The composition of claim 1 wherein said fibers are cellulose fibers.

8. The composition of claim 7 wherein said cellulose fibers are derived from waste paper.

9. An aqueous insulative coating composition having film-forming solids consisting essentially of kaolin particles in an amount of about 30 to about 90% by weight, waste paper fibers in an amount from about 1 to about 5% by weight and a minor amount of a dispersing agent for said solids in the aqueous composition, said kaolin particles having a diameter less than about 50 microns.

10. The composition of claim 9 wherein said dispersing agent is selected from the group consisting of nonionic and anionic surfactants.

11. The composition of claim 10 wherein said dispersing agent is present in an amount of from about 0.01 to about 1.5% by weight.

12. The composition of claim 9 further comprising a cellulosic thickener in an amount of from about 0.01 to about 1.5% by weight.

13. The composition of claim 9 further comprising a latex binder in an amount of from about 5 to about 20% by weight.

14. The composition of claim 13 wherein said latex binder is selected from the group consisting of an acrylic resin, a vinyl acetate polymer and copolymers thereof.

* * * * *